United States Patent
Rothschild

(10) Patent No.: US 9,054,860 B1
(45) Date of Patent: Jun. 9, 2015

(54) DIGITAL VERIFIED IDENTIFICATION SYSTEM AND METHOD

(75) Inventor: Leigh M. Rothschild, Sunny Isles, FL (US)

(73) Assignee: SRR Patent Holdings, LLC, Miami, FL (US)

(*) Notice: Subject to any disclaimer, the term of this patent is extended or adjusted under 35 U.S.C. 154(b) by 2287 days.

(21) Appl. No.: 12/006,457

(22) Filed: Jan. 2, 2008

(51) Int. Cl.
| G06F 21/00 | (2013.01) |
| H04L 9/08 | (2006.01) |
| H04L 9/32 | (2006.01) |
| G06F 21/64 | (2013.01) |

(52) U.S. Cl.
CPC .......... *H04L 9/0825* (2013.01); *H04L 9/3247* (2013.01); *G06F 21/64* (2013.01)

(58) Field of Classification Search
USPC ................ 726/26; 713/176–180; 380/59
See application file for complete search history.

(56) References Cited

U.S. PATENT DOCUMENTS

| 6,757,826 B1* | 6/2004 | Paltenghe ............... 713/170 |
| 6,895,507 B1* | 5/2005 | Teppler .................. 726/19 |
| 6,948,069 B1* | 9/2005 | Teppler .................. 713/178 |
| 6,978,369 B2* | 12/2005 | Wheeler et al. .......... 713/170 |
| 7,047,416 B2* | 5/2006 | Wheeler et al. .......... 713/182 |
| 7,603,621 B2* | 10/2009 | Toyama et al. .......... 715/707 |
| 7,844,918 B1* | 11/2010 | Ashe ................... 715/838 |
| 2002/0026575 A1* | 2/2002 | Wheeler et al. .......... 713/156 |
| 2003/0115151 A1* | 6/2003 | Wheeler et al. .......... 705/64 |
| 2003/0217275 A1* | 11/2003 | Bentley et al. .......... 713/184 |
| 2005/0050462 A1* | 3/2005 | Whittle et al. .......... 715/517 |
| 2005/0160272 A1* | 7/2005 | Teppler ................. 713/178 |
| 2006/0173847 A1* | 8/2006 | Peterson et al. ......... 707/9 |
| 2008/0040693 A1* | 2/2008 | Toyama et al. .......... 715/865 |
| 2008/0082509 A1* | 4/2008 | Bessieres et al. ........ 707/3 |

OTHER PUBLICATIONS

"The Digital Signature Media Tab," Caphyon, Dec. 18, 2005.*

* cited by examiner

*Primary Examiner* — Oscar Louie
(74) *Attorney, Agent, or Firm* — Greer, Burns & Crain, Ltd.

(57) ABSTRACT

A digital verified identification system and method are presented for verifying and/or authenticating the identification of an entity associated with an electronic file, such as, for example the digital signatory thereof. In particular, the system and method include a module generating assembly structured to receive at least one verification data element, and at least one digital identification module structured to be associated with at least one entity. The digital identification module is capable of being disposed or embedded within at least one electronic file. Further, the digital identification module includes at least one primary component structured to at least partially associate the digital identification module with the entity, and one or more metadata components.

39 Claims, 9 Drawing Sheets

DIGITAL VERIFIED IDENTIFICATION SYSTEM AND METHOD

BACKGROUND OF THE INVENTION

1. Field of the Invention

The present specification is generally directed to a digital verified identification system and method having at least one digital identification module structured to be embedded or otherwise disposed within one or more electronic files.

2. Description of the Related Art

In general, contracts, letters, messages, notes, and/or other hard copies of papers or documents may be physically signed, for example, with a pen or other writing utensil, by one or more entities to identify the provenance of the document and/or otherwise associate the document with the respective entity. In addition, often times a notary public or other witness is used or required assist in the verification or authentication of the identity of the signatory of the document. With the advent of computers and the proliferation of the World Wide Web, however, many people and/or entities tend to conduct business or otherwise communicate electronically. As a result, various methods of associating an electronic file or document with one or more entities, or otherwise including electronic signatures on the electronic file or document, have been developed. For example, at least one common method of electronically signing a document includes placing a forward or backward slash prior to and/or following the signatory's typed name. Accordingly, an individual named John Doe might electronically sign a document by placing "/John Doe/" on a signature line that is typically at or near the end of the document. These various electronic signatures or identifiers, however, are rather difficult to authenticate, and as such, it has become an arduous, if not impossible task to verify and/or authenticate the identity of the signatory to a respectable degree.

Accordingly, there is a current need in the art for a digital verified identification system structured to facilitate authenticating and/or verifying the identity of an electronic signatory to a file and/or otherwise structured to associate an electronic file with one or more entities. As such, it would be beneficial to provide a system having one or more digital identification modules structured to be embedded or otherwise disposed within at least one electronic file or document. In particular, it would be advantageous if the digital identification module is created or otherwise generated by a module generating assembly utilizing at least one verification data element corresponding to the one or more entities, such as, for example, a signatory of the electronic file.

It addition, it would be particularly beneficial to provide a digital verified identification system wherein the one or more digital identification modules include at least one primary component and at least one metadata component having, for example, various identifying information and/or reference codes and/or numbers. In particular, the primary component may include the signature or other identifying indicia of the respective signatory. Additionally, the metadata component(s) may include, for example, a module or entity reference code and/or number, the signatory's name, the date/time, or other data corresponding to the signatory and/or the signatory's digital identification module.

SUMMARY OF THE INVENTION

The present specification is directed to a digital verified identification system and method including a module generating assembly structured to create at least one digital identification module, wherein the digital identification module is structured to be embedded or otherwise disposed within one or more electronic files. Moreover, an entity, such as a signatory of an electronic document, may communicate at least one verification data element to the module generating assembly prior to creating the digital identification module. The verification data element(s) may include any indicia or data structured to facilitate the verification or identification of the corresponding entity. For example, the verification data element(s) may include a username and/or password, date of birth, social security number, driver's license number, credit card number, etc.

Additionally, in at least one embodiment, the digital identification module includes a file or object that may be imported into a computer application to facilitate embedding or otherwise disposing the digital identification module into an electronic file, such as, for example a word processing document. In at least one embodiment, however, the module generating assembly is at least partially integrated within the computer application, e.g., an interactive word processing program, such that the digital identification module created therefrom may be directly embedded within the electronic file rather than first being imported into the computer application.

Furthermore, the digital identification module of at least one embodiment includes at least one primary component and at least one metadata component. The primary component may include, for example, a digital representation of a signature and/or one or more reference codes, numbers, or characters, the significance of which will be apparent from the discussion below. The primary component is generally visible or perceptible to a reader, recipient, or other user of the electronic document. In addition, the metadata components may be representative of the one or more of the verification data elements, or other data corresponding to the digital identification module and/or entity, including the date and time, location of the entity, etc.

A reader, recipient, or other user of the electronic document may access some or all of the metadata components of the digital identification module, for example, by activating the module. Specifically, the user may hover a mouse or other pointing device thereon, or click on the digital identification module via the mouse or pointing device. In addition, a user may communicate the one or more reference codes, which may be part of the primary component(s) and/or the metadata component(s), to a third party to access some or all of the metadata components.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
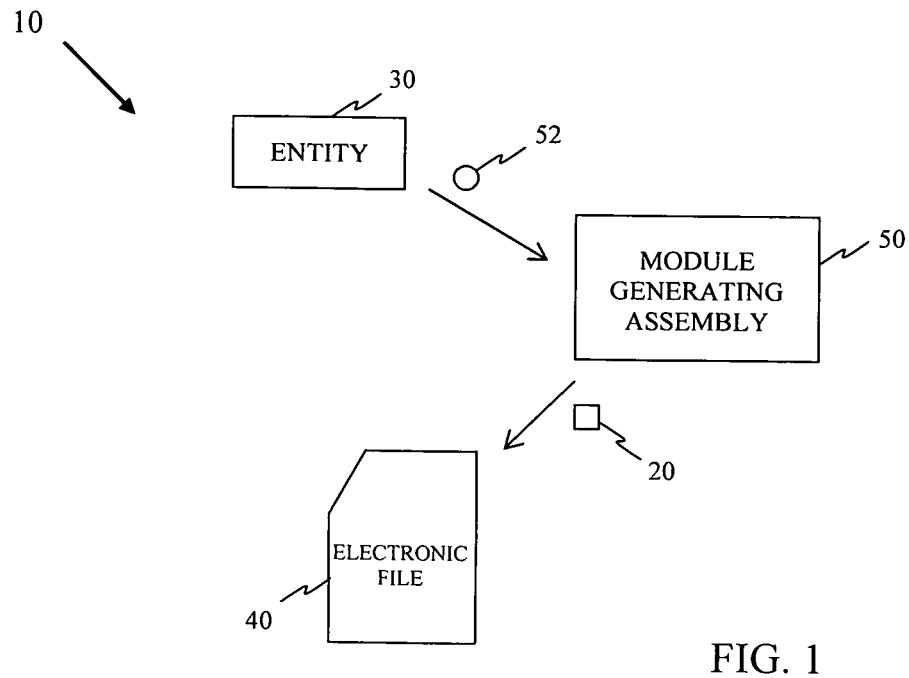
FIG. 1 is a schematic representation of one embodiment of the digital verified identification system of the present specification.
Figure 1A:
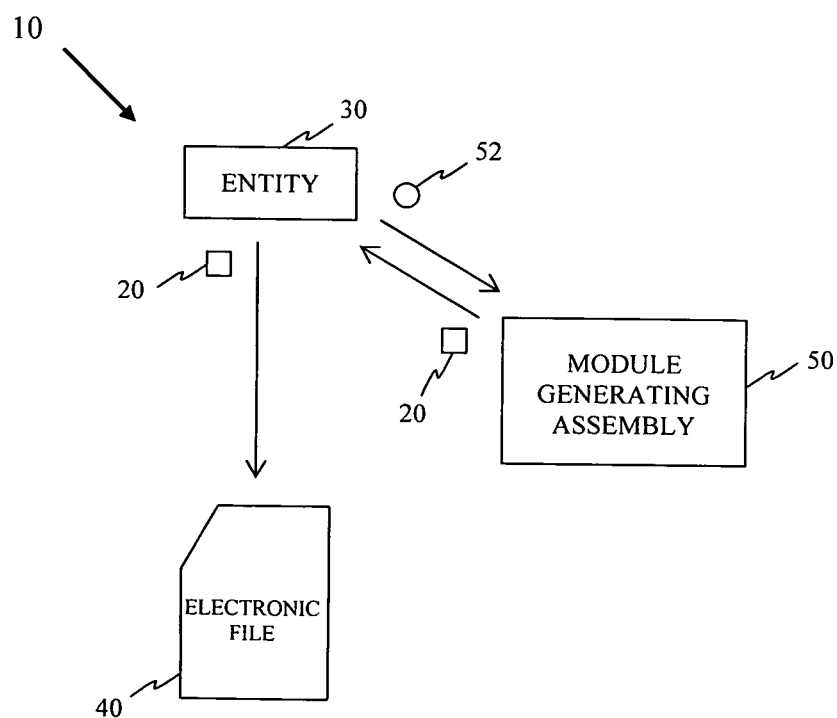
FIG. 1A is a schematic representation of another embodiment of the digital verified identification system of the present specification.

As shown in the accompanying drawings, and in particular FIGS. 1 and 1A, the present specification relates to a digital verified identification system, generally indicated as 10. At least one embodiment of the present system 10 includes one or more digital identification modules 20 structured to be associated with one or more entities 30 such as, for example, an individual, a group of individuals, and/or a signatory of a document or file. In particular, as will become apparent from the discussion below, the digital identification module(s) 20 of the various embodiments of the present system 10 may include virtually any file, item, object, or device structured to be embedded or otherwise disposed within an electronic file or document 40. In at least one embodiment of the present system 10, the digital identification module 20 includes an image or photographic file, including, but in no way limited to a Joint Photographic Experts Group ("JPEG") file, bitmap or pixmap file, Portable Network Graphics ("PNG") file, Graphics Interchange Format ("GIF") file, and/or any other file(s) or documents. Additionally, however, in at least one other embodiment of the system 10, the digital identification module 20 includes one or more objects, codes and/or other devices structured to facilitate the practice of the present system 10 in the intended fashion.

Figure 2:
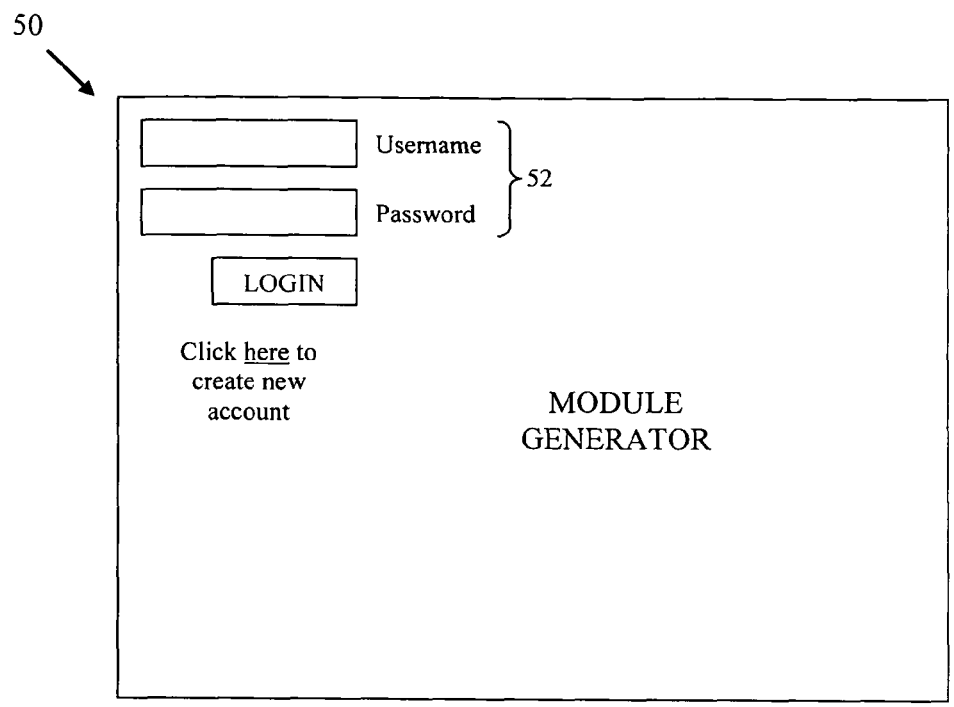
FIGS. 2, 2A, and 2B are illustrative of one embodiment of the module generating assembly of the digital verified identification system of the present specification.
Figure 2A:
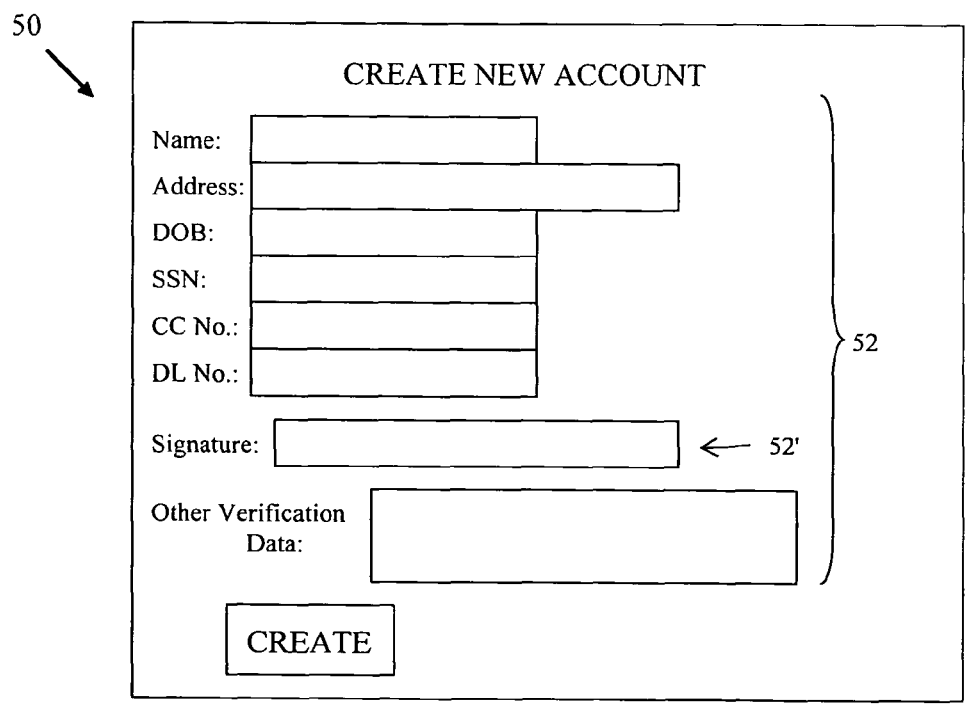
Figure 2B:
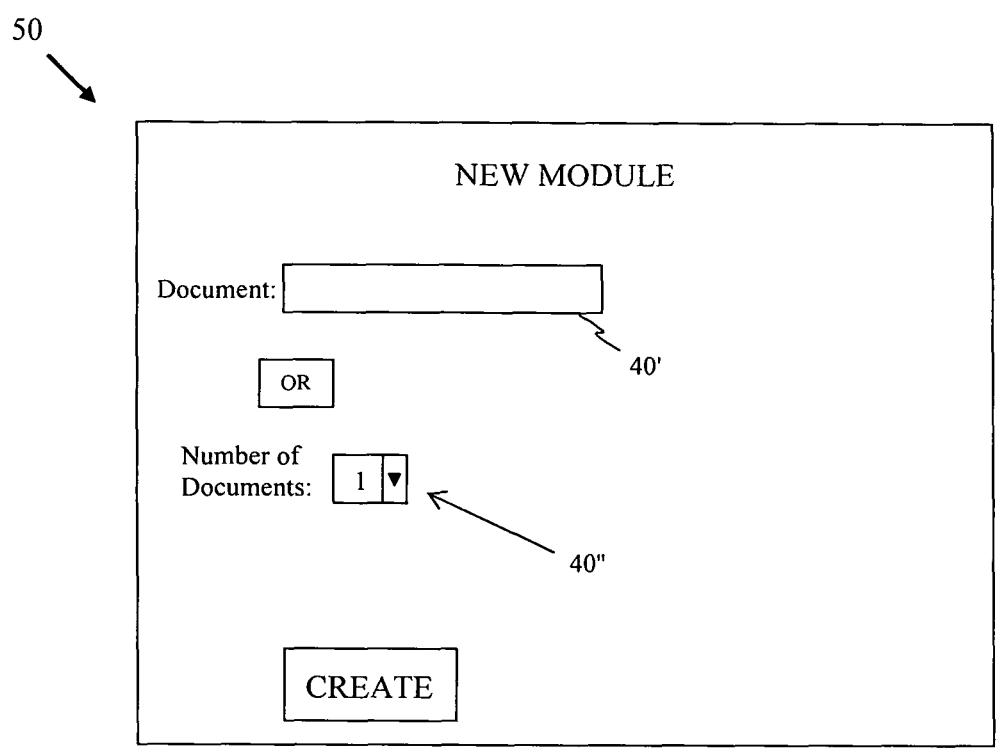

Furthermore, at least one embodiment of the system 10 of the present specification includes a module generating assembly 50 structured to receive at least one verification data element 52 corresponding to the at least one entity 30. In addition, the module generating assembly 50 is further structured to create or otherwise generate the digital identification module 20 of the various embodiments of the present system 10. More in particular, FIGS. 2, 2A, 2B represent at least one illustrative embodiment of the module generating assembly 50 of the present system 10. The verification data element(s) 52 of the various embodiments of the present system 10 include any information or data structured to at least partially facilitate authenticating and/or verifying the identity of the respective individual, person, or other entity 30. Particularly, as illustrated in FIG. 2, the module generating assembly 50 may include or require, for example, the entity 30 to enter, type in, or otherwise communicate a username and/or a password in order to gain access to or otherwise use the module generating assembly 50. The username and/or password may be utilized as the verification data element(s) 52 for purposes of verification and/or authentication of the respective entity 30.

Additionally, in at least one embodiment of the module generating assembly 50, as illustrated in FIG. 2A, a user or entity 30 may create a new account, for example, by communicating one or more verification data elements 52 to the module generating assembly 50. For illustrative purposes only, the verification data elements 52 as shown in FIG. 2A include the entity's name, address, date of birth ("DOB"), social security number ("SSN"), Driver's License number ("DL No."), a credit card number ("CC No."), etc. In addition, as represented by reference numeral 52' in FIG. 2A, the entity 30 may upload, import, or otherwise indicate a file, such as an image or picture file, representing a digital rendition of the entity's signature, for example.

As mentioned above, the module generating assembly 50 of the various embodiments of the system 10 is structured to create at least one digital identification module 20. In particular, assuming an entity 30 has already logged into the module generating assembly 50 or otherwise communicated at least one verification data element 52 thereto, in at least one embodiment of the present system 10, the particular electronic file 40 in which the module 20 will be embedded or disposed, may be specified or pre-selected, as shown at reference numeral 40' in FIG. 2B, prior to creating the digital identification module 20. In such an embodiment, the digital identification module 20 may be structured to be embedded, disposed, or otherwise operable only with the pre-selected electronic file 40. In yet another embodiment, however, as represented by reference numeral 40" in FIG. 2B, the number of electronic documents in which the digital identification module 20 can be embedded or disposed into, or otherwise operate with may be pre-selected or pre-specified. In such an embodiment, when the digital identification module 20 has been embedded or disposed into electronic documents totaling the pre-selected number, the digital identification module 20 may be automatically deleted, become inoperable, or otherwise be disposed in an inactive state. It is also contemplated that, in at least one embodiment, each digital identification module 20 is structured to be embedded within a single electronic document 40.

Additionally, in at least one embodiment of the present system 10, the digital identification module 20 is structured to be disposed in an inactive state upon manipulating the content(s) 42 of the electronic file 40 subsequent to embedding the digital identification module 20 therein. In particular, if the content(s) 42 of the electronic file 40 are manipulated, deleted, changed, or added to subsequent to embedding or otherwise disposing the digital identification module 20 therein, the digital identification module 20 may be automatically deleted or removed from the electronic file 40. In addition, the digital identification module 20 may be crossed out, or automatically stamped "void", for example.

Moreover, in at least one embodiment of the present system 10, once the digital identification module 20 is embedded or otherwise disposed within the electronic file 40, a user or recipient of the file 40 cannot delete or remove the digital identification module 20 therefrom. In addition, should an electronic copy of the electronic file 40 be made subsequent to embedding or otherwise disposing a digital identification module 20 therein, the copy of the electronic file 40 may also include a copy of the digital identification module 20 embedded therein.

Figure 3:
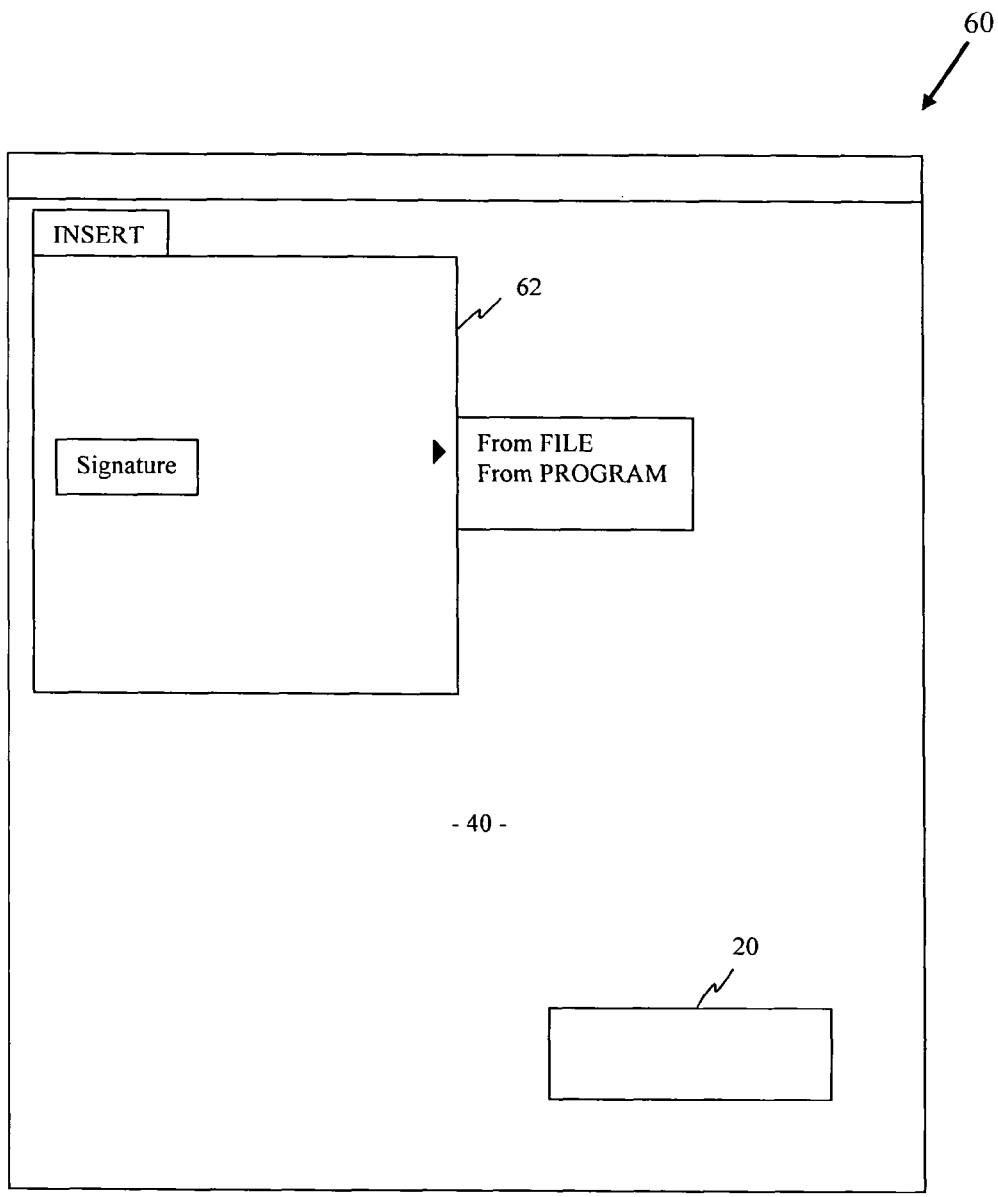
FIG. 3 is a schematic representation of one embodiment of the computer application of the digital verified identification system of the present specification.
Figure 3A:
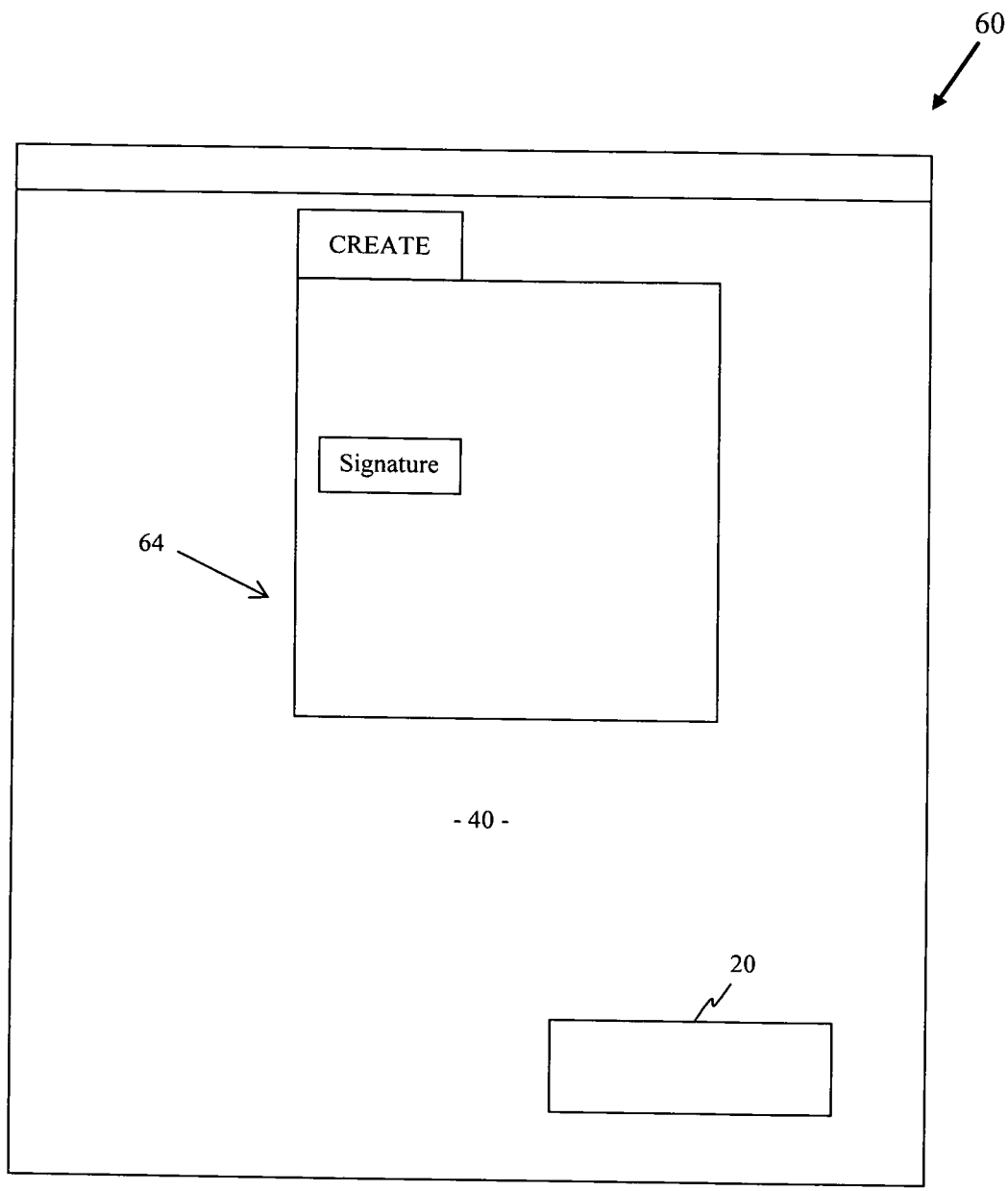
FIG. 3A is a schematic representation of another embodiment of the computer application of the digital verified identification system of the present specification.

Furthermore, as illustrated in FIGS. 3 and 3A, at least one embodiment of the present system 10 includes a computer application 60 structured to embed or otherwise dispose the digital identification module 20 within the electronic file 40. The computer application 60 may include, but is not limited to, any program structured to create or otherwise manipulate an electronic file 40. In particular, the computer application 60 may include virtually any interactive file handling program and/or word processing program, such as, MICROSOFT® WORD, MICROSOFT® WORD PERFECT, and/or ADOBE® ACROBAT®. For illustrative purposes only, as shown by the pull-down menu item 62 in FIG. 3, the computer application 60 may be structured to import or insert the digital identification module 20 from a file or an external program, such as the module generating assembly 50. In such an embodiment, the module generating assembly 50 may be a program which is completely independent of the interactive word processing program or other computer application 60. For example, the module generating assembly 50 of at least one embodiment is a separate and independent program or service that may be structured to create an object or file, such as a JPEG, GIF, PNG, or a signature file, which can be imported, inserted, or otherwise embedded or disposed within the electronic file 40 by virtue of the computer application 60. Accordingly, the module generating assembly 50 of at least one embodiment of the present system 10 includes a separate program that is run or executed on the entity's 30 computer or other device. When the entity 30 desires to create a digital identification module 20, the entity 30 may access the module generating assembly 50, either via the computer application 60, or independent of the computer application 60.

In yet another embodiment, however, as shown in FIG. 3A, the module generating assembly 50 may be at least partially integrated within the interactive word processing program, or other computer application 60. As such, the computer application 60 may include a feature, option, or function, represented by pull-down menu item 64, that is structured to initiate the module generating assembly 50 so as to create and/or embed the digital identification module 20 within the electronic file 40.

Figure 4:
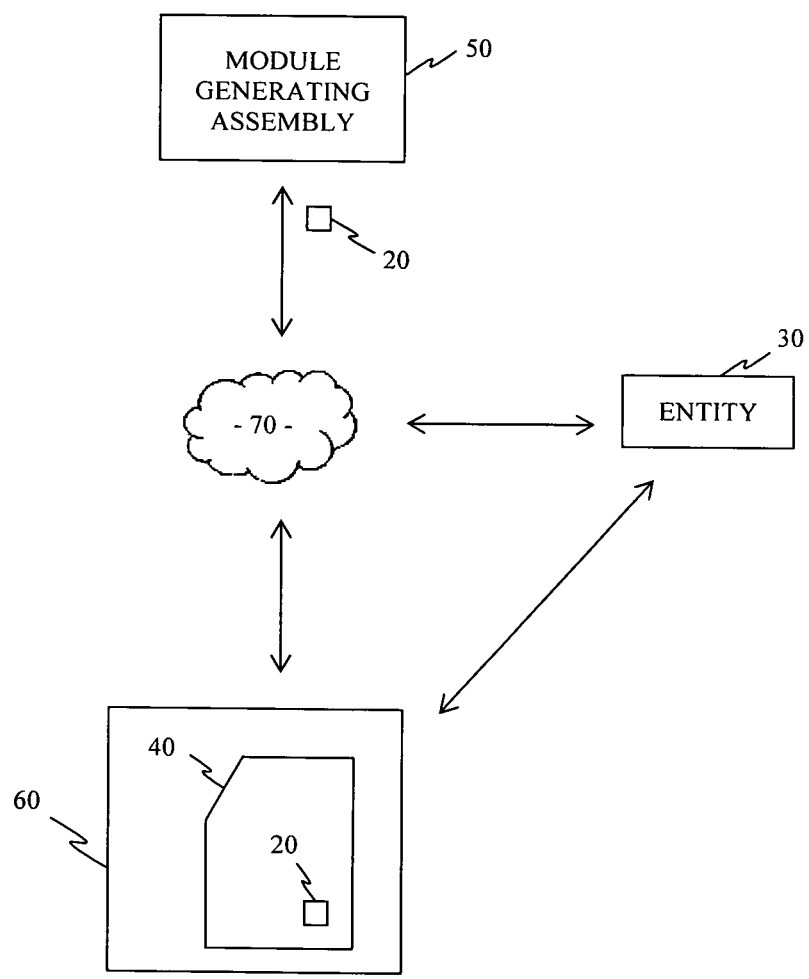
FIG. 4 is a schematic representation of yet another embodiment of the digital verified identification system of the present specification.

In addition, and as illustrated in FIG. 4, the module generating assembly 50 of the present system 10 may be accessed via at least one interactive computer network 70, such as the World Wide Web via the Internet. In such an embodiment, the module generating assembly 50 may be accessed through a web site whereby the digital identification module 20 may be downloaded and then embedded or otherwise disposed within the electronic file 40.

It is also contemplated that the electronic file 40 may include a document, form, or other file disposed on the World Wide Web. In such an embodiment, the digital identification module 20 may be uploaded to the particular web server, web site, or other form or document on the World Wide Web so as to associate the particular file with the respective entity 30. Of course if the digital identification module 20 is created via a web site, the module 20 may not need to be uploaded in certain circumstances.

Figure 5:
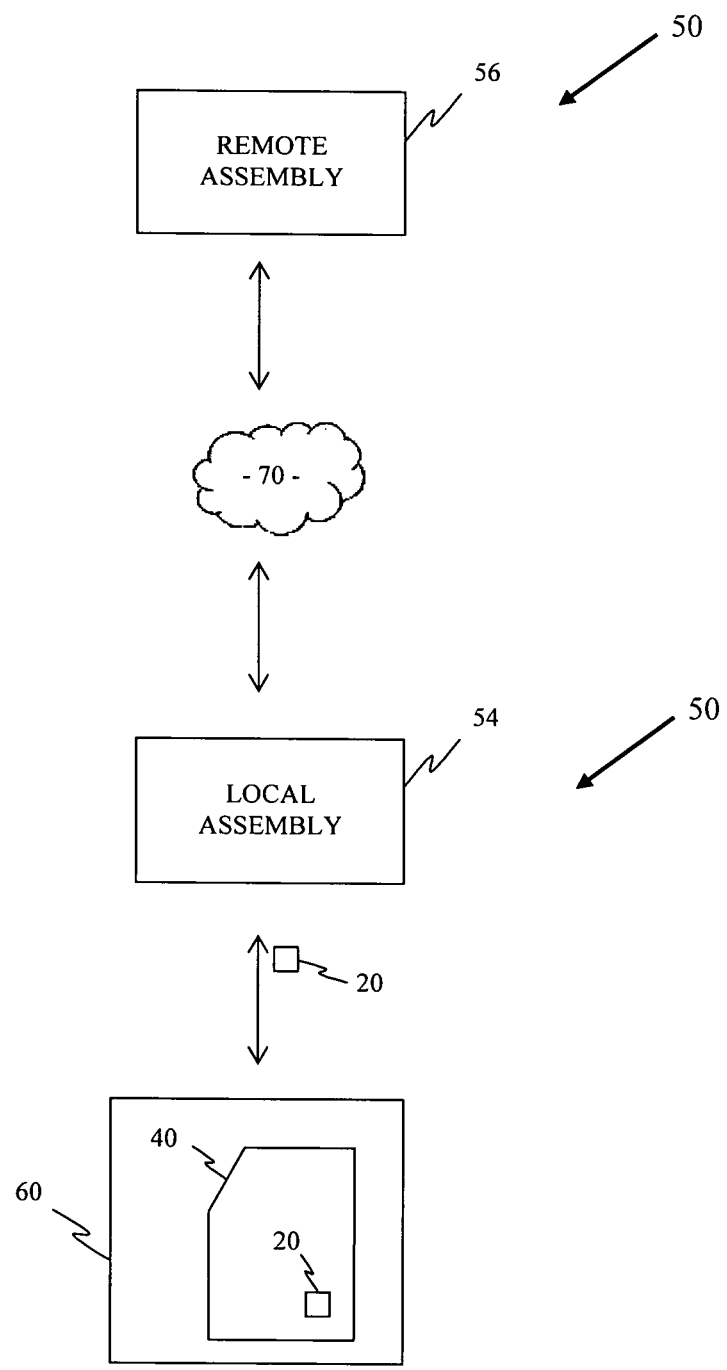
FIG. 5 is a schematic representation of another embodiment of the digital verified identification system of the present specification.

It should be apparent that the module generating assembly 50 of the various embodiments of the present system 10 may include one or more devices or mechanisms structured to facilitate the practice of the present system 10 in the intended manner. For example, as illustrated in FIG. 5, at least one embodiment of the module generating assembly 50 may include a local assembly 54 or other program, application, or plug-in disposed on the entity's 30 computer or included within the computer application 60, such as the interactive word processing program, as described above. In addition, the module generating assembly 50 may also include a remote assembly 56 or program accessible via an interactive computer network 70, such as the World Wide Web, and disposable in a communicative relation with the local assembly 54. In at least one embodiment, the remote assembly 56 is structured to store or otherwise include various information or data about the entity 30, such as, for example the entity's account, verification data element(s), etc. That information may then be communicated to the local assembly 54 via the interactive computer network 70. Accordingly, the local assembly 54 of at least one embodiment, may be structured to thereafter create the digital identification module 20. In yet another embodiment, however, the remote assembly 56 is structured to create the digital identification module 20, which is then communicated to the local assembly 54.

Figure 6:
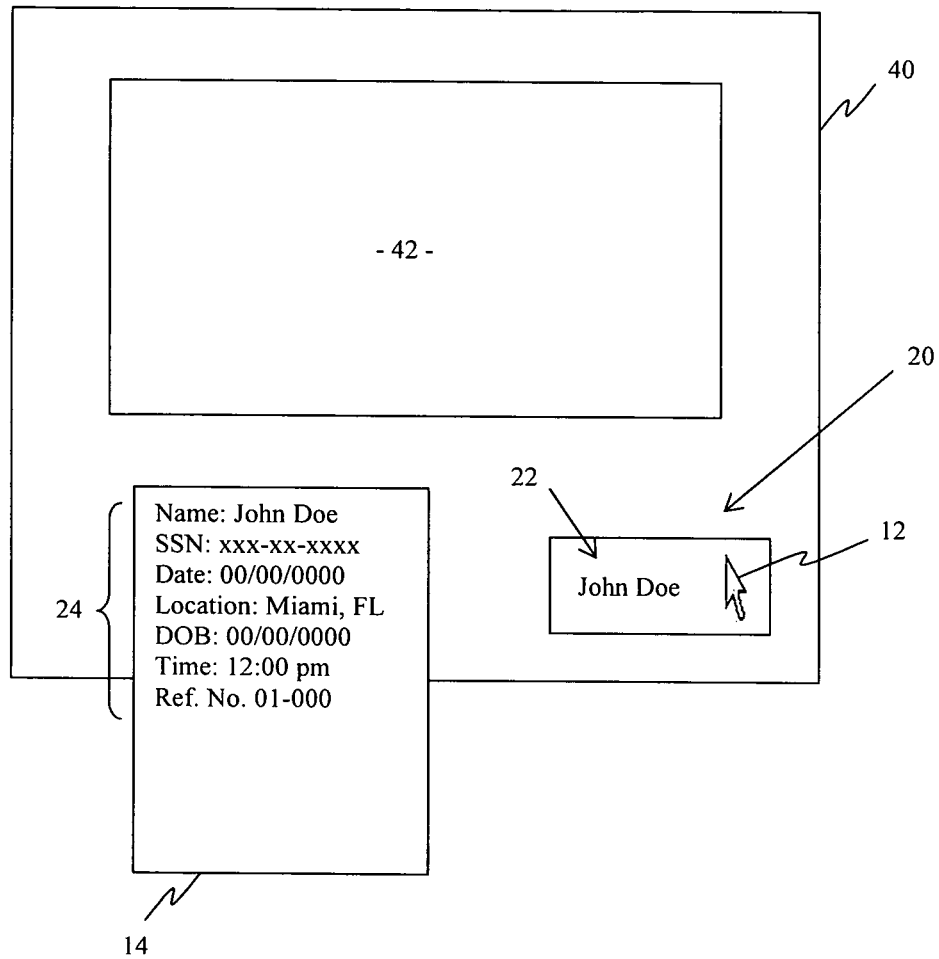
FIG. 6 is a schematic representation of one embodiment of the digital identification module of the present specification.

Furthermore, as illustrated in FIG. 6, the digital identification module 20 of at least one embodiment of the present system 10 includes a primary component 22 and one or more corresponding metadata components 24. In particular, the primary component 22 of the digital identification module 20 is preferably at least partially visible or perceptible to a user reviewing the electronic file 40. Furthermore, should the electronic file 40 be printed, in at least one embodiment, the primary component 22 is structured to be at least partially visible on the physical or printed document. Accordingly, in at least one embodiment of the present system 10, the primary component 22 may include a digital signature of the entity 30 or signatory of the document, or other element structured to at least partially associate the electronic file 40 with the entity 30. In addition, the primary component 22 may comprise a graphical representation of the digital signature, and as such, may include, for example, a JPEG, BMP, PNG, or GIF file.

Moreover, as above, at least one embodiment of the present system 10 further includes one or more corresponding metadata components 24. In particular, the corresponding metadata components 24 are structured to correspond to, for example, the entity 30, the respective digital identification module 20, the entity's computer, the one or more verification data elements 52, etc. Accordingly, in at least one embodiment, the metadata component(s) 24 include, but are in no way limited to the date and time the digital identification module 20 was created, the computer or device the digital identification module 20 or electronic file 40 was created on, the computer or device that embedded the digital identification module 20 into the electronic file 40, GPS location of the entity 30 or computer/device that created or embedded the file 40, the country, zip code, state, city or other information pertaining to the location of the entity 30, the location of the computer or device that embedded the digital identification module 20 into the electronic file 40, tracing information to the computer that created or embedded the module 20, notes, etc. In particular, the metadata component(s) 24 may include a graphical representation of a digital signature, and as such, may include, for example, a JPEG, BMP, PNG, or GIF file. Additionally, the metadata component(s) 24 may include computer identification numbers or characters corresponding to the computer in which the digital identification module 20 was created, initiated, or otherwise institutes, such as the entity's 30 computer. As such, the metadata component(s) 24 may include, for example, a computer's Media Access Control ("MAC") address or other identification numbers, characters, or data.

Furthermore, in at least one embodiment, the metadata component(s) 24 may include a unique module reference code or number corresponding to the digital identification module 20, or a unique entity reference code or number corresponding to the entity 30. Accordingly, once an individual, such as the recipient of the electronic file 40, has knowledge of or access to the module or entity reference codes, it is contemplated that the reference codes may be communicated to the module generating assembly 50, or other third party, such as, for example a web site, and gather more information about the entity 30 or the particular digital identification module 20. For example, the third party may have information to verify the entity 30 or signatory, or otherwise provide some or all of the metadata components 24 either corresponding to the entity 30, the respective digital identification module 20, or both.

In addition, the digital identification module 20 of at least one embodiment may be structured to display, show, or reveal some or all of the corresponding metadata components 24, such as, for example, upon the occurrence of one or more predetermined events, including, but not limited to, a mouse over or clicking event. Accordingly, as illustrated in FIG. 6, in at least one embodiment, when a mouse, pointer, or other like device 12 is disposed, hovered, or rolled over the digital identification module 20, such as, for example, the primary component 22 thereof, the digital identification module 20 is structured to reveal some or all of the metadata component(s) 24 in a pop-up box 14, or other like structure or device. It is also contemplated that in at least one embodiment of the present system 10, a user must click on the digital identification module 20, or primary component 22 thereof, in order to view some or all of the metadata component(s) 24. Additionally, in yet another embodiment, when a user disposes or hovers the mouse or other pointing device 12 over the digital identification module 20, some metadata components 24 are revealed, and when a user clicks on the module 20 or primary component 22, additional and/or other metadata components 24 are revealed. Furthermore, in yet another embodiment, a user may need to communicate a valid username and password or other identification information prior to viewing some or all of the metadata components 24 of the particular digital identification module 20.

Moreover, the identification of the entity 30 with which the electronic file 40 is associated may be verified by the module generating assembly 50. For example, as above, the verification data element(s) 52 may include, for example, identification information such as a name, address, and credit card number. Accordingly, the module generating assembly 50 may, in at least one embodiment, contact the corresponding financial institution for verifying that the verification data element(s) 52 indeed corresponds to the entity 30 prior to generating the digital identification module 20. On the other hand, at least one embodiment of the present system 10 is structured to provide metadata components 24 to the user or recipient of the electronic file 40 such that the user or recipient can verify the identity of the respective entity 30 associated with the electronic file 40.

Figure 7:
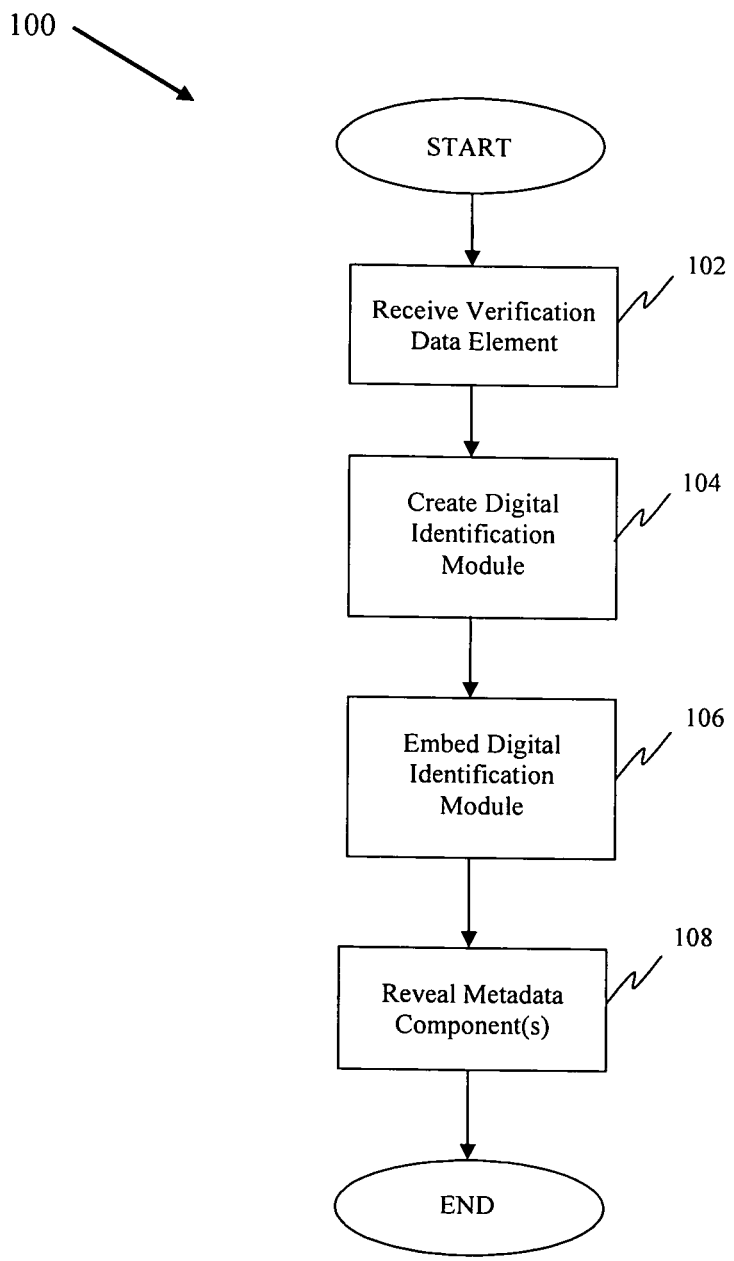
FIG. 7 is a flow chart of one embodiment of the method of digital identification verification of the present specification.

In addition, and as illustrated in FIG. 7, the present specification relates to a method of digital identification verification, generally indicated as 100. In particular, as illustrated at 102 in FIG. 7, at least one embodiment of the method 100 includes receiving at least one verification data element from an entity. As above, the verification data element may include a username and/or password, the entity's name, address, date of birth, social security number, driver's license number, credit card number, etc. In the various embodiments of the present method 100, as described in greater detail above, the entity communicates the at least one verification data element to a module generating assembly, which may be accessed via an interactive computer network. In addition, the module generating assembly may be at least partially integrated within a computer application such as an interactive word processing program, as a feature, option, or plug-in for example. It is also contemplated that the module generating assembly is completely separate and independent from the interactive word processing program or other like computer application structured to manipulate electronic files.

Furthermore, still referring to FIG. 7, the method 100 of the present specification includes creating at least one digital identification module, as illustrated at 104. More in particular, in at least one embodiment, the entity may log into an account, or otherwise create a new account with the module generating assembly 50. Either in the process of creating a new account, logging in, or while logged in, the entity communicates at least one verification data element thereto. Furthermore, in at least one embodiment, the module generating assembly is structured to at least partially create the digital identification module(s), for example, by combining at least one primary component with at least one metadata component. The primary component may be representative of a digital rendition of the entity's signature, or a reference code. The metadata component(s) may include other corresponding data, including but not limited to the verification data elements, the date and time of creating the identification module, the location or other identifying information corresponding to the computer or device that was used to embed the identification module, etc.

Moreover, the various embodiments of the method 100 of the present specification include embedding the at least one digital identification module within the electronic file, represented as 106 in FIG. 7. Accordingly, in at least one embodiment, the entity may import a file, i.e., a digital identification module, created by the module generating assembly into the electronic file via a computer application, such as, for example, an interactive word processing program or other application structured to create or manipulate electronic files, or otherwise structured to facilitate the practice of the present method in the intended fashion. As above, however, in at least another embodiment, the module generating assembly is at least partially integrated within the computer application, such as the word processing program, for example, as a feature, option, or plug-in. In such an embodiment, the digital identification module need not be imported, but is rather created, at least in part, by the module generating assembly.

Once the digital identification module is embedded within the electronic file, at least one embodiment of the present method 100 includes revealing at least one metadata component, represented as 108 in FIG. 7. More in particular, a user, such as the recipient of the electronic file, may activate the digital identification module by hovering a mouse or other pointing device over it, or by clicking on it with the mouse or other pointing device. In such an instance, at least one embodiment of the present method 100 will reveal some or all of the metadata components, for example, via a pop-up box or other like structure or device. In addition, a user, such as the recipient of the electronic document may communicate a reference code to a third party, for example, the module generating assembly, a web site, or other device, object, or service, and receive in return one or more metadata components corresponding to the respective digital identification module and/or entity. The reference code may be obtained via the metadata from the digital identification module, however, in at least one embodiment, the reference code appears as part of the primary component thereof. Upon receipt of the metadata components or other identifying information, the user or recipient of the electronic file may verify the data to at least partially verify or authenticate the identification of the entity associated with the digital identification module and/or electronic document.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A digital verified identification system, comprising
at least one digital identification module structured to be associated with at least one entity,
a module generating assembly structured to receive at least one verification data element corresponding to the at least one entity and create said at least one digital identification module,
said at least one digital identification module being disposable within at least one electronic file, and
said at least one digital identification module comprising at least one primary component structured to at least partially associate said digital identification module with said at least one entity, wherein
said at least one digital identification module is cooperatively structured to be embedded within only a single electronic file.

2. The digital verified identification system recited in claim 1 further comprising at least one computer application structured to embed said at least one digital identification module within the electronic file.

3. The digital verified identification system recited in claim 2 wherein said at least one computer application includes an interactive file handling program.

4. The digital verified identification system recited in claim 1 wherein said module generating assembly is accessible via at least one interactive computer network.

5. The digital verified identification system recited in claim 1 wherein said at least one primary component includes a digital signature.

6. The digital verified identification system recited in claim 5 wherein said at least one primary component includes a graphical representation of said digital signature.

7. The digital verified identification system recited in claim 1 wherein said at least one digital identification module further comprises at least one corresponding metadata component.

8. The digital verified identification system recited in claim 1 wherein said digital identification module further comprises a plurality of corresponding metadata components.

9. The digital verified identification system recited in claim 8 wherein said plurality of corresponding metadata components are structured to be revealed in response to the occurrence of at least one predetermined event.

10. The digital verified identification system recited in claim 9 wherein said at least one predetermined event includes disposing a pointing device over said primary component.

11. The digital verified identification system recited in claim 9 wherein said at least one predetermined event includes clicking on said primary component with a pointing device.

12. The digital verified identification system recited in claim 8 wherein at least one of said plurality of corresponding metadata components includes a module reference number corresponding to said at least one digital identification module.

13. The digital verified identification system recited in claim 8 wherein at least one of said plurality of corresponding metadata components includes an entity reference number corresponding to the at least one entity.

14. The digital verified identification system recited in claim 8 wherein at least one of said plurality of corresponding metadata components includes a graphical representation of a digital signature.

15. The digital verified identification system recited in claim 8 wherein at least one of said plurality of corresponding metadata components includes a MAC address corresponding to a computer that instituted the creation of said digital identification module.

16. The digital verified identification system recited in claim 1 wherein said at least one digital identification module is cooperatively structured to correspond to a pre-selected electronic file.

17. The digital verified identification system recited in claim 1 wherein said at least one digital identification module is structured to be disposed in an inactive state upon manipulating the at least one electronic file subsequent to embedding said at least one digital identification module therein.

18. The digital verified identification system recited in claim 1 wherein said at least one verification data element includes a unique identification number.

19. The digital verified identification system recited in claim 18 wherein said unique identification number includes a social security number.

20. The digital verified identification system recited in claim 18 wherein said unique identification number includes a driver's license number.

21. The digital verified identification system recited in claim 18 wherein said unique identification number includes a credit card number.

22. The digital verified identification system recited in claim 1 wherein said at least one verification data element includes a username and a password.

23. A digital verified identification system, comprising:
a module generating assembly structured to receive at least one verification data element corresponding to at least one entity and create at least one digital identification module, wherein said at least one digital identification module is structured to be associated with said at least one entity,
said at least one digital identification module further structured to be embedded within at least one electronic file,
said at least one digital identification module comprising at least one primary component structured to at least partially associate said at least one digital identification module with said at least one entity, wherein said at least one primary component includes a digital signature, wherein
said at least one digital identification module is cooperatively structured to be embedded within only a single electronic file.

24. The digital verified identification system recited in claim 23 further comprising a plurality of corresponding metadata components.

25. The digital verified identification system recited in claim 23 wherein said at least one electronic file is pre-selected.

26. A method of digital identification verification, comprising:
receiving at least one verification data element from an entity,
creating at least one digital identification module corresponding to the entity, wherein the digital identification module includes at least one primary component at least partially associated with the entity, and embedding the at least one digital identification module within an electronic file, wherein said at least one digital identification module is cooperatively structured to be embedded within only a single electronic file.

27. The method as recited in claim 26 further comprising defining receiving at least one verification data element from the entity as receiving a valid username and password from the entity.

28. The method as recited in claim 26 further comprising defining receiving at least one verification data element from the entity as receiving at least one unique identification number from the entity.

29. The method as recited in claim 26 further comprising verifying the at least one verification data element.

30. The method as recited in claim 26 further comprising combining at least one primary component with at least one metadata component to at least partially create the at least one digital identification module.

31. The method as recited in claim 30 further comprising activating the digital identification module in response to at least one predetermined event.

32. The method as recited in claim 31 further comprising defining the at least one predetermined event as hovering a pointing device over the primary component.

33. The method as recited in claim 31 further comprising defining the at least one predetermined event as clicking on the primary component with a pointing device.

34. The method as recited in claim 31 further comprising revealing the at least one metadata component in response to activating the digital identification module.

35. The method as recited in claim 30 further comprising communicating at least one reference code to a third party.

36. The method as recited in claim 35 further comprising revealing the at least one metadata component in response to communicating at least one reference code to a third party.

37. The method as recited in claim 32 further comprising pre-selecting the electronic file.

38. The method as recited in claim 32 further comprising pre-selecting a number of electronic files.

39. A method of verifying the identification of an entity associated with an electronic file, comprising:

receiving at least one verification data element from the entity, creating at least one digital identification module corresponding to the entity by at least partially combining a primary component with at least one metadata component, wherein the primary component includes a digital signature, and embedding the at least one digital identification module within the electronic file, wherein said at least one digital identification module is cooperatively structured to be embedded within only a single electronic file.

* * * * *